United States Patent
Park et al.

(10) Patent No.: US 6,828,409 B2
(45) Date of Patent: Dec. 7, 2004

(54) HOST-GUEST POLYMER SYSTEM COMPRISING POLYMER HAVING ISOIMIDE GROUP AND ORGANIC CHROMOPHORE, SIDE-CHAIN NONLINEAR OPTICAL POLYMER DERIVED FROM THE SAME, AND METHOD FOR SYNTHESIZING SIDE-CHAIN NONLINEAR OPTICAL POLYMER

(75) Inventors: Seung Koo Park, Daejeon (KR); Jung Yun Do, Daejeon (KR); Jung Jin Ju, Daejeon (KR); Suntak Park, Daejeon (KR); Myung-Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 10/331,337

(22) Filed: Dec. 31, 2002

(65) Prior Publication Data

US 2004/0030059 A1 Feb. 12, 2004

(30) Foreign Application Priority Data

Aug. 9, 2002 (KR) .......................... 2002-47196

(51) Int. Cl.$^7$ .............................. C08G 73/10
(52) U.S. Cl. .................. 528/170; 528/310; 528/353; 525/420; 525/422; 525/436
(58) Field of Search .................. 528/170, 310, 528/353; 525/420, 422, 436

(56) References Cited

U.S. PATENT DOCUMENTS

| 5,104,944 A | * | 4/1992 | Goldberg et al. ............ 525/436 |
| 5,112,881 A |   | 5/1992 | Mandal et al. |
| 5,187,241 A | * | 2/1993 | Buchwalter et al. ........ 525/420 |
| 5,242,551 A | * | 9/1993 | Frank et al. ................ 548/417 |
| 5,290,824 A |   | 3/1994 | Mandal et al. |
| 5,420,172 A |   | 5/1995 | Nordmann et al. |
| 5,484,821 A |   | 1/1996 | Mandal et al. |
| 5,776,374 A |   | 7/1998 | Newsham et al. |
| 6,051,722 A | * | 4/2000 | Honda et al. ............... 549/407 |

OTHER PUBLICATIONS

Young Jun Kim, et al.; Rapid Report Preventing gelatin in polyisoimide synthesis; Polymer International; 49:8–10 (2000); pp. 8–10.

* cited by examiner

Primary Examiner—P. Hampton Hightower
(74) Attorney, Agent, or Firm—Piper Rudnick LLP

(57) ABSTRACT

A host-guest polymer system including a polymer with an isoimide group and an organic chromophore and capable of converting into a side-chain polymer system, a side-chain nonlinear optical polymer derived from the host-guest polymer system, and a method for synthesizing the side-chain nonlinear optical polymer are provided. The method for synthesizing the side-chain nonlinear optical polymer involves forming a nonlinear optical polymer film based on a host-guest system in which an organic chromophore having a reactive group capable of nucleophilic reaction with an isoimide group is dispersed in a matrix including a polymer with the isoimide group having the following formula:

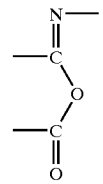

Next, the nonlinear optical film is poled at a first temperature in an electric field; and the organic chromophore is reacted with the polymer while poling at a second temperature which is higher than the first temperature, to synthesize the side-chain nonlinear optical polymer.

13 Claims, 2 Drawing Sheets

HOST-GUEST POLYMER SYSTEM COMPRISING POLYMER HAVING ISOIMIDE GROUP AND ORGANIC CHROMOPHORE, SIDE-CHAIN NONLINEAR OPTICAL POLYMER DERIVED FROM THE SAME, AND METHOD FOR SYNTHESIZING SIDE-CHAIN NONLINEAR OPTICAL POLYMER

BACKGROUND OF THE INVENTION

1. Field of the Invention

The present invention relates to a polymer having nonlinear optical properties and a method for synthesizing the same, and more particularly, to a host-guest polymer system suitable for use in the manufacture of optical devices for high-speed, high-capacity data transmission systems, a side-chain nonlinear optical polymer derived from the host-guest polymer system, and a method for synthesizing the side-chain nonlinear optical polymer.

2. Description of the Related Art

Recently, the fast development of optical devices for high-speed, high-capacity data transmission systems has highly increased the need for new materials suitable therefore. As such, research on nonlinear optical materials has been actively performed in various aspects. To date, inorganic crystals, such as $LiNbO_3$ or InGaAsP, have been used as materials for high-speed optical devices for optical communications. These inorganic crystals have stable, high optical non-linearity. However, every step of synthesizing the inorganic crystals is complicated and time consuming, thereby increasing the manufacturing cost of the inorganic crystals.

Meanwhile, organic nonlinear optical materials, which were first developed about 20 years ago, and in particular, organic polymers, are advantageous over inorganic materials in terms of their synthesis and processing procedures, and in that their physical properties, including the processing temperature, refractive index, optical coefficient, conversion of absorption wavelength, and the like, are controllable according to the various requirements. Thus, many approaches to obtain organic nonlinear optical polymers are being currently undertaken. Organic chromophores have in their molecular structure conjugate linkages for electron mobility and dipoles that are highly responsive to an external electric field due to the introduction of electron donating and electron accepting groups. Such an organic chromophore is incorporated in any form into polymers to form organic nonlinear optical polymers.

Organic nonlinear optical polymers are categorized into one of four types according to the correlation between their nonlinear optical organic chromophore and polymer (G. A. Lindsay, "Second-Order Nonlinear Optical Polymers: An Overview," ACS Symp. Ser. 60, G. A. Lindsay and K. D. Singereds., ACS, 1995, chap. 1).

A first type is a host-guest polymer system where an organic chromophore is dispersed in a polymer matrix and it can be obtained in a very simple way. As long as the organic dye can be dispersed in the polymer matrix, the mobility of organic chromophore molecules increases within the polymer, so that the polymer system provides maximized a poling effect. However, its optical non-linearity is greatly reduced in the manufacture of optical devices at a high temperature due to its free molecular movement. And, as the amount of organic dye increases, the glass transition temperature (Tg) of the polymer system decreases, and light scattering occurs due to an agglomeration of organic chromophore molecules, thereby resulting in optical loss.

A second type is a side-chain polymer system. This side-chain polymer system is the result of efforts made to overcome the drawbacks of the host-guest polymer system. An organic chromophore is chemically bound to a polymer in order to prevent the agglomeration of the organic dye molecules and to provide the resulting polymer system with an appropriate Tg, for example, of about 150–200° C., for nonlinear optical stability at high temperatures. However, since poling efficiency is the greatest near Tg at which molecular movement of the polymer molecules is highly active, the optical non-linearity obtained at 150° C. or less is likely to disappear during manufacture of devices at about 100° C. Also, poling at a temperature of 200° C. or greater likely decomposes the organic chromophore (M. H. Lee et al., "Polymeric Electrooptic 2×2 Switch consisting of Bifuraction Optical Active Waveguides and a Mach-Zehnder Interferometer," *IEEE J. on Selected Topics in Quantum Electronics*, 7, 812, 2001).

A third type is a main-chain polymer system obtained by incorporation of a nonlinear optical organic chromophore into a polymer main chain. As can be expected from this structure, the main-chain polymer system has lower molecular mobility than the side-chain polymer system and provides poor poling effect, but its optical non-linearity is thermally stable.

A fourth type is a cross-linked polymer system. This type of polymer system is provided for enhancing the thermal stability of the organic nonlinear optical polymer after poling. The cross-linked polymer system is applied to the host-guest polymer system and the side-chain polymer system having a low Tg. The cross-linked polymer system is obtained by poling a nonlinear optical polymer and cross-linking the polymer so as to improve a poling efficiency and the nonlinear optical stability of the organic chromophore at a high temperature. As a result of cross-linking the polymer, the mobility of the organic chromophore molecules decreases, and the great optical nonlinearity can be maintained even at a high temperature. In general, the polymer chain is thermal- or photo-crosslinked in the presence of a catalyst. However, after the cross-linking reaction, the unreacted cross-linkers or catalyst remain and thus limits use of the cross-linked polymer system in optical devices (U.S. Pat. Nos. 5,420,172 and 5,776,374).

In conclusion, to provide high optical nonlinearity and stably maintain the non-linearity at a high temperature, it seems to be most ideal to obtain the optical non-linearity by poling in a host-guest polymer system to maximize the poling effect and then converting into a side-chain polymer system to increase the thermal stability of the poling effect. In U.S. Pat. Nos. 5,484,821, 5,290,824, and 5,112,881, an organic chromophore having a cinnamoyl group is dispersed in polyvinylcinnamate, polyvinylstyrylacrylate, or polyvinylchalcone, poled in the host-guest polymer system, and photo-crosslinked. However, according to these disclosures, limited kinds of polymer matrixes, although their synthesis is easy, are used, and it is inconvenient to chemically incorporate the cynnamoyl group into the organic chromophore.

SUMMARY OF THE INVENTION

Accordingly, the present invention provides a host-guest polymer system having nonlinear optical properties suitable for use in the manufacture of optical devices, which are enhanced to be physically, chemically, and optically stable and maintain its nature in the manufacture of optical devices.

The present invention also provides a side-chain nonlinear optical polymer with enhanced, thermally stable optical non-linearity at high temperature, by maximizing poling effect and enhancing thermal stability after poling.

The present invention also provides a method for synthesizing the side-chain nonlinear optical polymer with enhanced, thermally stable optical non-linearity by maximizing poling effect and enhancing after poling.

In one aspect, the present invention provides a host-guest polymer system comprising: a polymer with an isoimide group having the following formula; and an organic chromophore having a hydroxy group or an amino group,

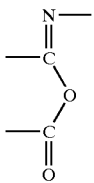

In another aspect, the present invention provides a method for synthesizing a side-chain nonlinear optical polymer, the method comprising: forming a nonlinear optical polymer film based on a host-guest system in which an organic chromophore having a reactive group capable of nucleophilic reaction with an isoimide group is dispersed in a matrix including a polymer with the isoimide group having the following formula:

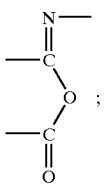

poling the nonlinear optical film at a first temperature in an electric field; and reacting the organic chromophore with the polymer while poling at a second temperature which is higher than the first temperature, to synthesize the side-chain nonlinear optical polymer.

In the method for synthesizing the side-chain nonlinear optical polymer, the matrix includes polyisoimide having the isoimide group in its main chain. Alternatively, the matrix includes a polymer having the isoimide group in its side chain.

In the method for synthesizing the side-chain nonlinear optical polymer, the matrix is formed of a homopolymer having a repeating monomer unit, which has the isoimide group in its main or side chain, a copolymer having the repeating monomer unit, or a polymer blend containing the copolymer having the repeating monomer unit and the homopolymer.

In the method for synthesizing the side-chain nonlinear optical polymer, the organic chromophore comprises π-conjugated organic molecules. The organic chromophore comprises organic molecules having an electron donating group and an electron accepting group. The organic chromophore comprises a hydroxy group or an amino group which can be reacted with the isoimide group in the polymer matrix.

The first temperature is in the range of 100–200° C.

In another aspect, the present invention provides a side-chain nonlinear optical polymer synthesized using the method described above.

The side-chain nonlinear optical polymer according to the present invention provides enhanced optical non-linearity suitable for manufacturing optical devices. The optical non-linearity of the side-chain polymer according to the present invention is thermally, physically, chemically, and optically stable, and thus its optical nature can be maintained in the manufacture of the optical device. The side-chain polymer according to the present invention is synthesized by maximizing poling effect and enhancing thermal stability, and thus its very high optical non-linearity can be maintained at high temperature.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF THE INVENTION

Figure 1:
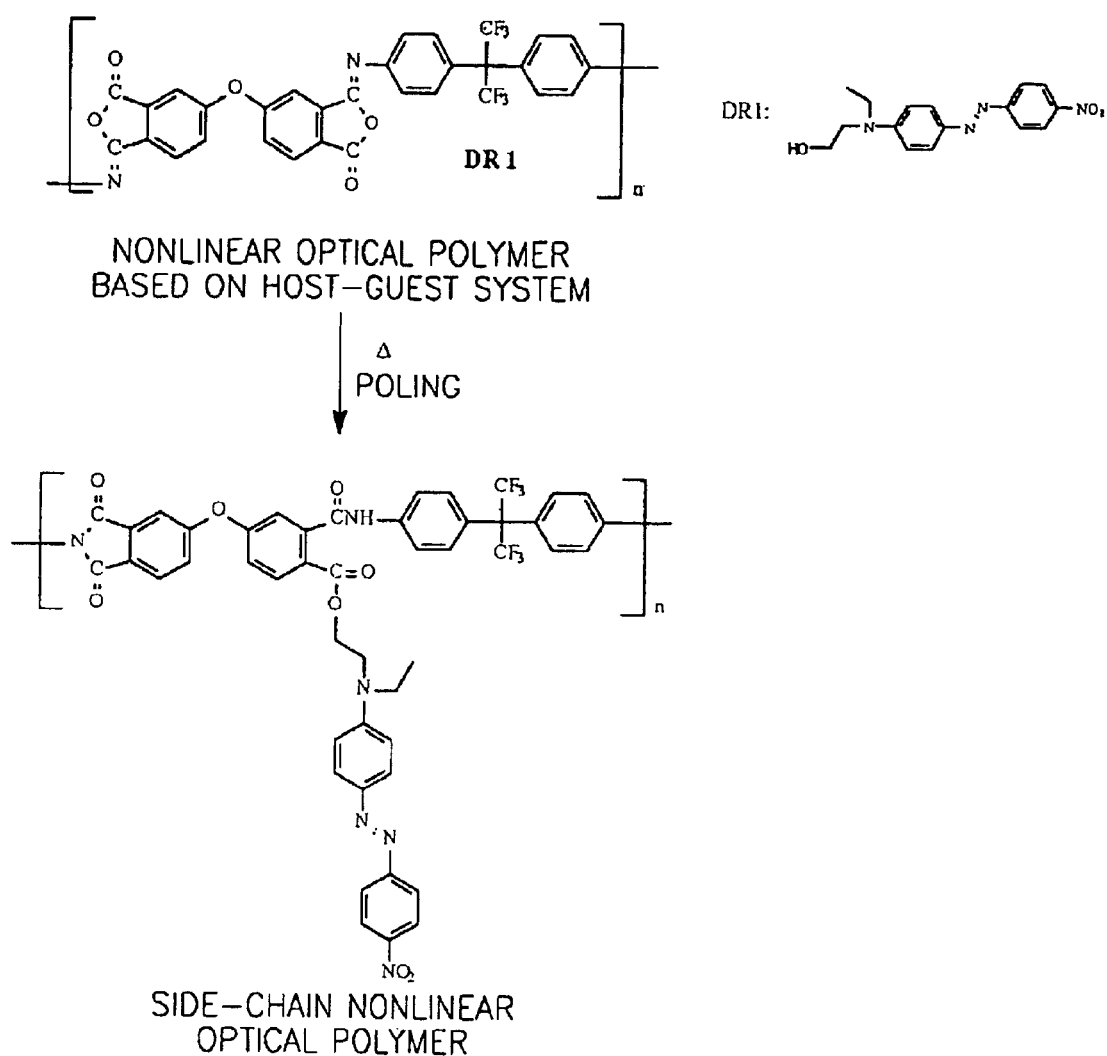
FIG. 1 illustrates changes in the chemical structure of a polymer system in each step of a method for synthesizing a side-chain nonlinear optical polymer system according to an embodiment of the present invention.

A host-guest polymer system according to the present invention includes a polymer with an isoimide group having formula (1) below and an organic chromophore with a hydroxy group or amino group.

Formula (1)

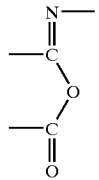

A side-chain nonlinear optical polymer according to the present invention is derived from the host-guest polymer system as follows.

In synthesizing the side-chain nonlinear polymer according to the present invention, initially a nonlinear optical polymer based on a host-guest polymer system is formed in which an organic chromophore is dispersed in a matrix including any polyisoimide with the isoimide group having formula (1) above in its main chain and any polymer with the isoimide group having formula (1) above in its side chain. The organic chromophore has a reactive group, such as a hydroxy group or an amino group, as expressed in formula (2) below, for a nucleophilic reaction with the isoimide group.

OH—D, NH$_2$—D              Formula (2)

In formula (2) above, D is an organic molecule providing optical nonlinearity.

In forming the nonlinear optical polymer film based on the host-guest system, the matrix used includes polyisoimides having the isoimide group of formula (1) above in its main chain and polymers having the isoimide group of formula (1) above in its side chain. The matrix can be formed of a homopolymer having a repeating monomer unit, which has the isoimide group in its main or side chain, a copolymer having the repeating monomer unit, or a polymer blend containing the copolymer having the repeating monomer unit and the homopolymer. The organic chromophore is composed of π-conjugated organic molecules. The organic chromophore is composed of organic molecules having an electron donating group and an electron accepting group, and preferably, a hydroxy group or an amino group.

After the nonlinear optical polymer film based on the host-guest system is formed, the nonlinear optical polymer film is poled at a first temperature by applying an electric field. The first temperature is determined to be near Tg of the nonlinear optical polymer film, and preferably, in the range of 100–200° C.

Next, the poled nonlinear optical polymer film is reacted with the organic chromophore at a second temperature which is higher than the first temperature under the conditions of poling, so that the side-chain optical polymer is produced.

In an embodiment according to the present invention, in the synthesis of the nonlinear optical polymer, polyisoimide, a precursor of polyimide, is used for the matrix of the host-guest polymer system. The isoimide group of the polyisoimide is highly susceptible to a nucleophilic reaction with the hydroxy group or amino group and thus forms an amide-ester bond at a high temperature (F. W., Harris, "Synthesis of aromatic polyimides from dianhydrides and diamines", Polyimides, D. Wilson, H. D. Stenzenberger, and P. M. Hergenrother eds., Blackie & Son, 1990, Chap. 1, and Y. J. Kim et al., Preventing gelation in polyisoimide synthesis, *Polym. Inter.*, 49, 8, 2000).

It is common in electrical poling to raise the poling temperature near Tg of a nonlinear optical polymer. Therefore, in the method for synthesizing the side-chain nonlinear optical polymer according to the present invention, poling is performed using the host-guest polymer system that provides maximized poling effect, and the guest-host polymer system is then converted into the corresponding side-chain polymer at a high temperature to maintain its optical nonlinearity.

In an embodiment according to the present invention, polyisoimide, a precursor of polyimide, is used for the polymer matrix. Any polyisoimide formed from, for example, diamine or dianhydride monomers, can be used without limitations. Any organic chromophore having a hydroxy group or an amino group can be used.

Since poling is thermally performed, a thermal reaction occurs spontaneously between the organic chromophore and the polymer. The unreacted isoimide group in the polymer is converted into an imide group that is more stable at a high temperature. When the isoimide group and the hydroxy group or amino group of the organic chromophore react, no reaction by-product is formed (F. W., Harris, "Synthesis of aromatic polyimides from dianhydrides and diamines", Polyimides, D. Wilson, H., D. Stenzenberger, and P. M. Hergenrother eds., Blackie & Son., 1990, Chap. 1). The resulting nonlinear optical polymer obtained after poling is thermally, optically, and chemically stable. A new concept of side-chain optical polymer can be implemented based on the above process.

As described above, according to the present invention, a polymer having the isoimide group is used as the matrix, and an organic chromophore having a hydroxy group or amino group, which shows nonlinear optical properties and is capable of nucleophilic reaction with the isoimide group at a high temperature, is dispersed in the matrix, thereby resulting in the nonlinear optical polymer film based on the host-guest system. Next, the nonlinear optical polymer film is poled in an electric field while raising the temperature, followed by further poling at a higher temperature than the previous poling so as to react the reactive group of the organic chromophore with the isoimide group of the polymer. Next, the temperature is lowered to room temperature while the electric field is continuously applied, thereby resulting in a complete side-chain polyimide nonlinear optical polymer.

FIG. 1 illustrates changes in the chemical structure of a polymer system in each step of a method for synthesizing a side-chain nonlinear optical polymer according to an embodiment of the present invention. In FIG. 1, 2,2-bis(4-aminophenyl)hexafluoropropane and polyisoimide synthesized from oxydiphthalic anhydride (ODPA) were used for the polymer matrix. Disperse Red 1 (DR1), a commercially available organic chromophore having a hydroxy group, were used for the organic chromophore.

The method for synthesizing the side-chain optical polymer as illustrated in FIG. 1 will be described in greater detail with reference to the following examples. The present invention is not limited to the reaction scheme of FIG. 1 and the following examples, and various substitutions, modifications, and changes may be made without departing from the spirit and scope of the invention.

EXAMPLE 1

Synthesis of Polyisoimide 1.61 g of 2,2-bis(4-amionophenyl)hexafluoropropane, which was purified at 220° C. under a reduced pressure, was completely dissolved in 14 mL of anhydrous N,N-dimethylformamide in a 100-mL-2-neck flask at room temperature under nitrogen, followed by an addition of 1.50 g of oxydiphthalic anhydride with vigorous stirring. After reaction for 24 hours, the resulting transparent polymerized solution was diluted into 10% solution with anhydrous N,N-dimethylformamide. Next, 1.4 mL of triethylamine was added to the solution, and 1.4 mL of trifluoroacetic anhydride was added dropwise to the solution and reacted further for about 1 hour. The solution was added dropwise into methanol to precipitate light yellow polyisoimide, followed by washing with methanol and vacuum drying at 60° C.

EXAMPLE 2

Synthesis of Side-chain Nonlinear Optical Polymer 0.35 g of the polyisoimide obtained in example 1 and 0.15 g of DR1 were completely dissolved in 2.83 g of cyclopentanone. The solution was filtered with a 0.2 μm Teflon filter to remove micro-particles. The concentration of the resulting solution was adjusted to about 15% by weight, and the amount of DR1 added was 10–40% by weight. The resulting solution was spin coated on an indium tin oxide (ITO) glass substrate at 800 rpm for 20 seconds and dried at 100° C. under vacuum for 24 hours to obtain a film having a thickness of about 2 μm. Gold (Au) was vacuum deposited on the film to a thickness of 1 μm to form an upper electrode. A voltage was applied to the film by applying a positive voltage of 100 V, based on 1 μm of the film thickness, to the gold upper electrode and grounding the ITO substrate. The film was poled by raising the temperature from 100° C. to 180° C. by 20° C., with a retention time of 5 minutes for each temperature increase. After poling, the temperature of the film was dropped to room temperature while the applied voltage was maintained, thereby resulting a polymer film. The optical properties of the resulting polymer film were measured.

Figure 2:
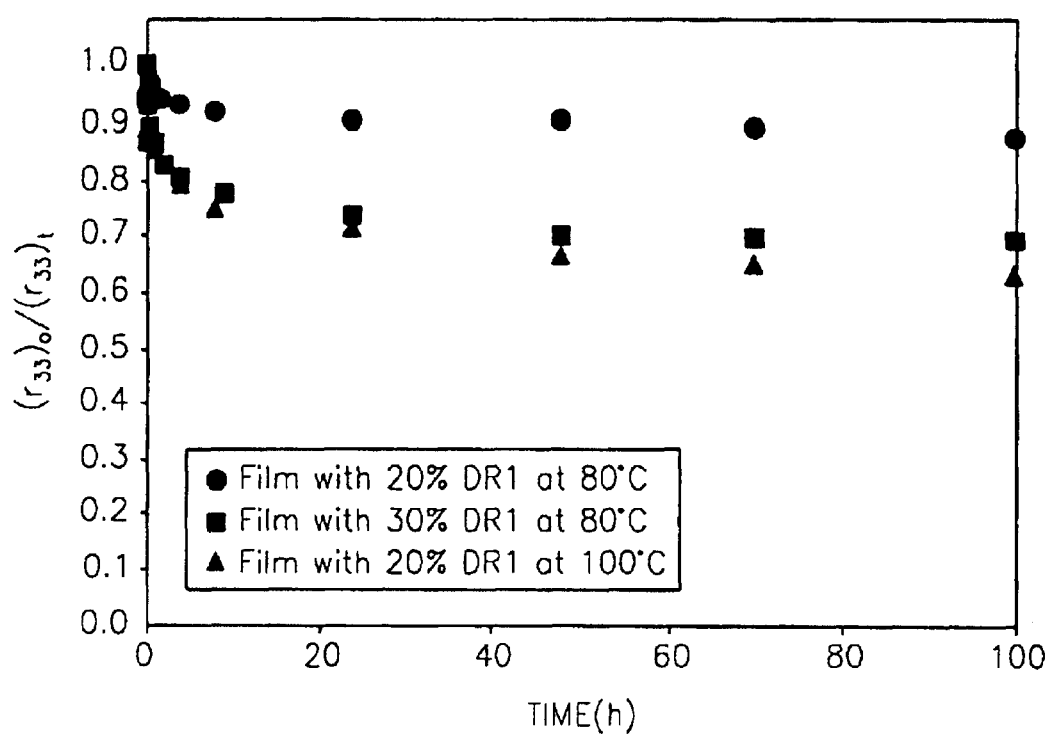
FIG. 2 is a graph illustrating the thermal stability of electro-optic effect of a variety of films formed by the method according to the present invention.

FIG. 2 is a graph illustrating the thermal stability of electro-optic property of various optical polymer films formed by the method according to the present invention. In FIG. 2, reference symbol ■ denotes the optical polymer film formed in example 2 with 30% DR1 by weight, and reference symbols ● and ▲ denote optical polymer films formed in the same manner as in example 2 except that the processing temperature was varied to 80° C. and 100° C., respectively, and 20% DR1 by weight was used. The optical polymer film of example 2 had a high nonlinear optical coefficient ($r_{33}$) of 10.5 pm/V at a wavelength of 1.55 μm. Due to the thermal reaction between the polymer matrix and the organic chromorphore after poling, the optical nonlinearity of the polymer film provided due to the poling was more thermo-stable. Also, no reaction by-product was generated from the reaction between the organic chromophore and the isoimide group. Also, the unreacted isoimide group converted to the corresponding imide group that is stable at a high temperature, thereby reducing optical loss during transmission.

As described above, in the method for synthesizing a side-chain nonlinear optical polymer according to the present invention, initially, a host-guest polymer system that can be formed by the simplest way among various nonlinear polymer synthesis methods is produced. In producing the host-guest polymer system, since an organic chromophore is simply dispersed in a polymer matrix, the mobility of organic chromophore molecules increases, so that the poling effect at its Tg is maximized. As described above, a polymer is liable to lose its optical non-linearity at a high temperature according to the above method. However, the nonlinear optical polymer according to the present invention is based on the host-guest system in which organic chromophore molecules are uniformly dispersed in the polymer matrix in film form. Thus, maximized poling effect can be obtained according to the present invention.

In the method for synthesizing the side-chain nonlinear optical polymer according to the present invention, the nonlinear optical polymer based on the host-guest system is derived by dispersing an organic chromophore having nonlinear optical properties in a polymer matrix having an isoimide group in its main or side chain, and the nonlinear optical polymer system is electrically poled at its Tg in order to maximize the poling effect. Next, the poled organic chromophore is chemically bound to a polymer main chain to synthesize the side-chain nonlinear optical polymer. As described above, in the method for synthesizing the side-chain nonlinear optical polymer according to the present invention, the nonlinear optical polymer is obtained by chemically stably binding organic chromophore molecules to the main chain of the polymer after obtaining maximized poling effect. In addition, the polyisoimide in the main chain is converted to the corresponding polyimide that is chemically stable at a high temperature, so that the optical nonlinear properties of the side-chain polymer become thermally stable. The side-chain nonlinear optical polymer according to the present invention is thermally and optically stable, satisfying the requirements for optical device materials.

The side-chain nonlinear optical polymer according to the present invention provides enhanced optical nonlinearity suitable to be used for manufacturing optical devices and is physically, chemically, and optically stable in the manufacture of optical devices. According to the present invention, the poling effect is maximized, and the thermal stability of the nonlinear optical polymer is enhanced, thereby improving the nonlinear optical properties of the optical polymer at high temperature.

While the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. A physical dispersion of an organic chromophore in a polymer matrix as a film in which:
   a) the polymer matrix is one with an isoimide group having the following formula:

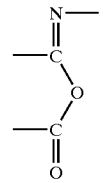

and b) the organic chromophore has a hydroxy group or an amino group.

2. A method for synthesizing a side-chain nonlinear optical polymer, the method comprising:

forming a nonlinear optical polymer film based on a host-guest system in which an organic chromophore having a reactive group capable of nucleophilic reaction with an isoimide group is dispersed in a matrix including a polymer with isoimide group having the following formula:

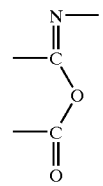

poling the nonlinear optical film at a first temperature in an electric field; and reacting the organic chromophore with the polymer while poling at a second temperature which is higher than the first temperature, to synthesize the side-chain nonlinear optical polymer.

3. The method of claim 2, wherein the matrix includes polyisoimide having the isoimide group in its main chain.

4. The method of claim 2, wherein the matrix includes a polymer having the isoimide group in its side chain.

5. The method of claim 2, wherein the matrix is formed of a homopolymer having a repeating monomer unit, which has the isoimide group in its main or side chain, a copolymer having the repeating monomer unit, or a polymer blend containing the copolymer having the repeating monomer unit and the homopolymer.

6. The method of claim 2, wherein the organic chromophore comprises π-conjugated organic molecules.

7. The method of claim 2, wherein the organic chromophore comprises organic molecules having an electron donating group and an electron accepting group.

8. The method of claim 2, wherein the organic chromophore comprises a hydroxy group.

9. The method of claim 2, wherein the organic chromophore comprises an amino group.

10. The method of claim 2, wherein the first temperature is in the range of 100–200° C.

11. A side-chain nonlinear optical polymer synthesized using the method of claim 2.

12. A host-guest polymer system comprising a physical dispersion of claim 1 in the absence of a nucleophilic reaction between the polymer matrix and the organic chromophore.

13. An electrically poled nonlinear optical polymer film of a host-guest polymer system of claim 12 wherein the organic chromophore has nonlinear optical properties and wherein poling is maximized at Tg.

* * * * *